United States Patent [19]
Taylor et al.

[11] 3,924,634
[45] Dec. 9, 1975

[54] SAFETY CATHETER AND METHOD
[75] Inventors: Glenn M. Taylor, Cary; Harish A. Patel, Crystal Lake; Daniel M. McWhorter, Arlington Heights, all of Ill.
[73] Assignee: The Kendall Company, Walpole, Mass.
[22] Filed: Sept. 11, 1974
[21] Appl. No.: 504,949

[52] U.S. Cl............................. 128/349 B; 128/246
[51] Int. Cl.²......................................... A61M 25/00
[58] Field of Search...... 128/349 B, 349 BV, 350 R, 128/351, 344, 246, 325

[56] References Cited
UNITED STATES PATENTS
| | | | |
|---|---|---|---|
| 1,643,289 | 9/1927 | Peglay................. | 128/246 |
| 2,548,602 | 4/1951 | Greenburg............ | 128/344 X |
| 3,053,257 | 9/1962 | Birtwell.............. | 128/349 B |
| 3,543,758 | 12/1970 | McWhorter........... | 128/349 B |
| 3,543,759 | 12/1970 | McWhorter........... | 128/349 BV |

*Primary Examiner*—Dalton L. Truluck
*Attorney, Agent, or Firm*—Powell L. Sprunger

[57] ABSTRACT

A catheter for insertion through a body canal to a body cavity and retention therein. The catheter has an elongated shaft having a proximal end, a distal end, and an inflation lumen. The catheter also has an elongated flexible balloon overlying the shaft and having a length approximating or greater than the length of the body canal, with the balloon and shaft defining a space communicating with the inflation lumen for inflation of the balloon. The balloon has a distal end portion for placement and inflation in the body cavity, and a proximal end portion being sufficiently elastic to maintain the distal end portion inflated when the distal end portion is located in the body cavity. The proximal end portion is also sufficiently elastic to inflate outside the body canal when the distal end portion is obstructed by the body canal.

29 Claims, 7 Drawing Figures

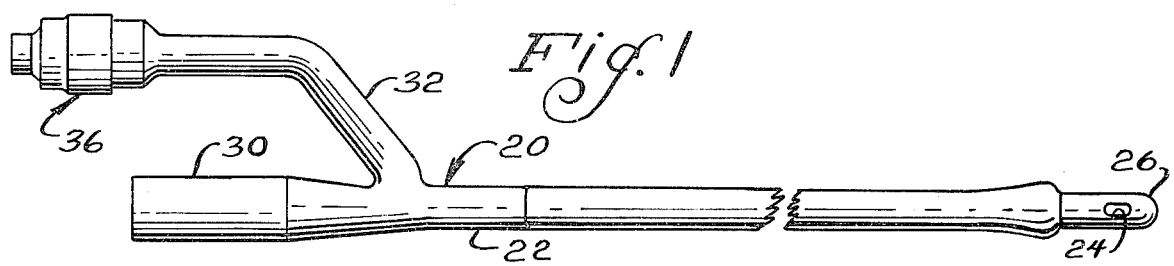
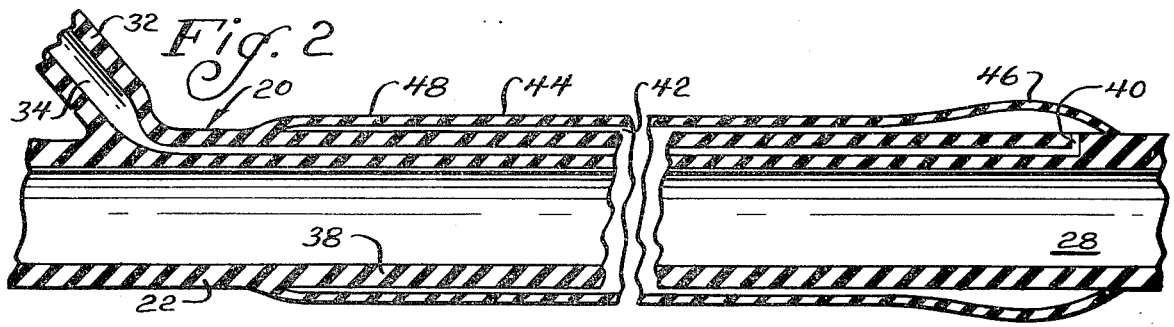
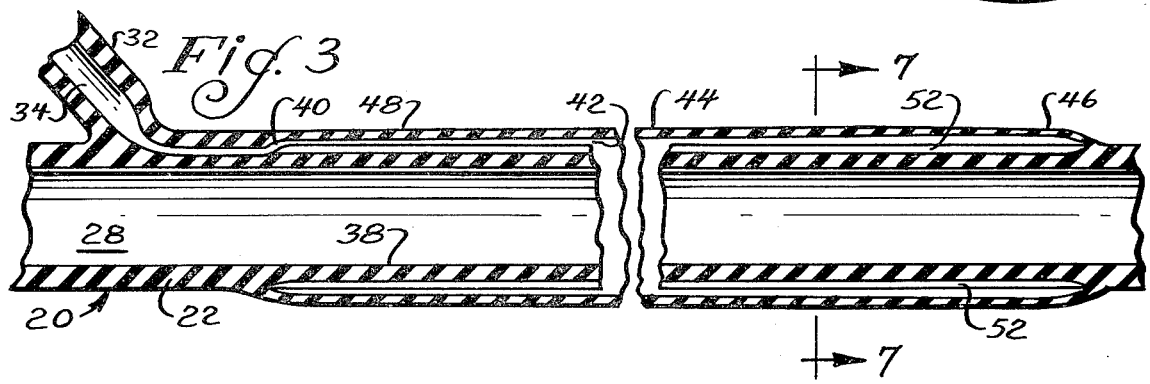
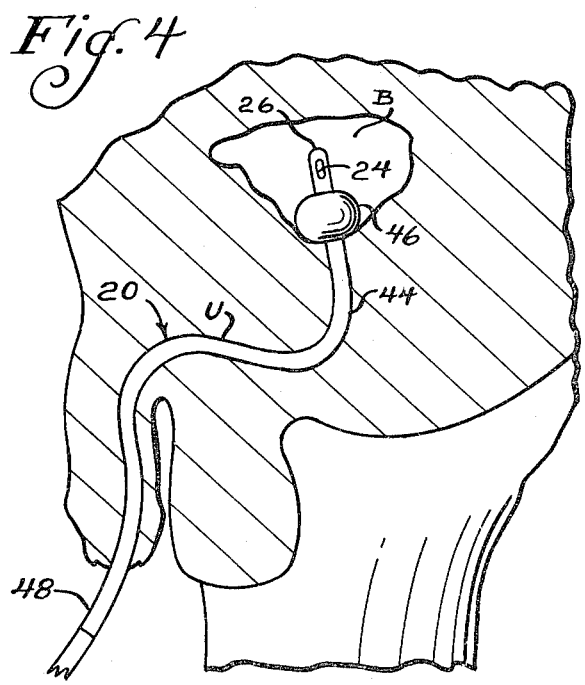
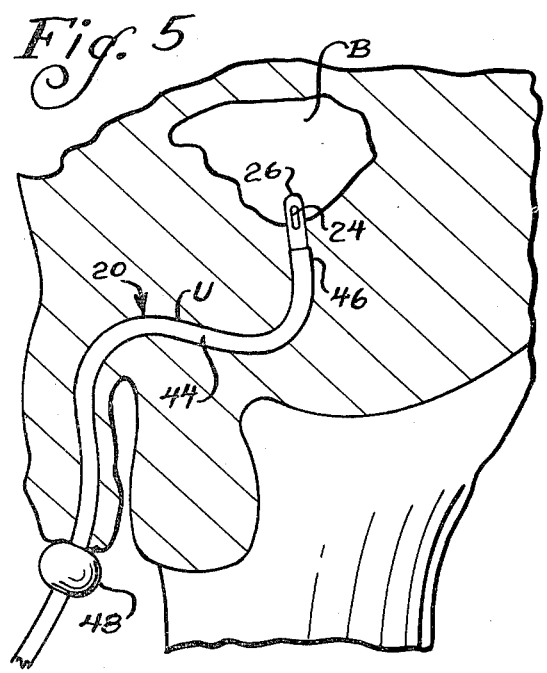

SAFETY CATHETER AND METHOD

BACKGROUND OF THE INVENTION

The present invention relates to catheters, and more particularly to catheters having a retention balloon.

The use of catheters to drain liquid from a body cavity of a patient is well known. For example, certain patients may be catheterized with a Foley catheter to drain urine from the bladder through the urethra. In such a procedure, a catheter is inserted through the urethra until a distal end of the catheter is located in the bladder, after which a balloon adjacent the distal end of the catheter is inflated through an inflation lumen to retain the catheter in the patient. A proximal end of the catheter which extends outside the patient's body is usually connected to a drainage tube leading to a drainage bag. Urine passes through a drainage eye adjacent the distal end of the catheter, a drainage lumen extending through the catheter, and the drainage tube to the bag for collection therein.

Although such a procedure is in common use, a few problems persist with conventional Foley catheters which are of concern to physicians. When the catheter is initially placed in the patient, particularly by a relatively inexperienced person, the catheter may be improperly positioned by not fully inserting the retention balloon through the urethra. If the balloon is located in the urethra when inflated it may rupture the urethra. Case histories verify that such incidents are not uncommon, and may go unnoticed for an extended period of time, possibly leading to serious complications, including death resulting from urinary extravasation and sepsis, before the condition is discovered.

Even if the retention balloon of a conventional Foley catheter has been properly inflated in the bladder, serious difficulties may later result among some catheterized patients, for example, senile patients. The patient may attempt to withdraw the catheter, along with the inflated balloon, through the urethra, resulting in damage to the urethra and the possible complications described above.

SUMMARY OF THE INVENTION

A principal feature of the present invention is the provision of a catheter of simplified construction which prevents harm to a patient during use.

The catheter of the present invention comprises an elongated shaft having a proximal end, a distal end, and an inflation lumen. The catheter has an elongated flexible balloon overlying the shaft and having a length approximating or greater than the length of a body canal of the patient, with the balloon and shaft defining a space communicating with the inflation lumen for inflation of the balloon. The balloon has a distal end portion for placement and inflation in a body cavity of the patient, and a proximal end portion inflatable outside the body canal.

A feature of the invention is that the proximal end portion is sufficiently elastic to maintain the distal end portion inflated when the distal end portion is located in the body cavity.

Another feature of the invention is that the proximal end portion is sufficiently elastic to inflate outside the body canal when the distal end portion is obstructed by the body canal.

A further feature of the invention is that the proximal end portion inflates upon attempts to inflate the distal end portion in the body canal, thus preventing damage to the body canal.

Still another feature of the invention is that the distal end portion deflates and the proximal end portion substantially immediately inflates when the patient attempts to withdraw the inflated distal end portion from the body cavity through the body canal, thus preventing damage to the body canal.

A feature of the invention is that the balloon has sufficient elasticity to cause retraction of the balloon to a position adjacent the outer surface of the shaft upon deflation of the balloon through the inflation lumen.

A further feature of the invention is that the proximal end of the balloon may be severed to deflate the distal end portion in the event the inflation lumen is blocked when it is desired to remove the catheter from the patient.

Another feature of the invention is the provision of a method for catheterizing a patient in a safe manner.

Further features will become more fully apparent in the following description of the embodiments of this invention and from the appended claims.

DESCRIPTION OF THE DRAWINGS

In the drawings:

FIG. 1 is a fragmentary elevational view of one embodiment of a catheter of the present invention;

FIG. 2 is a fragmentary sectional view of the catheter of FIG. 1;

FIG. 3 is a fragmentary sectional view of another embodiment of the catheter of the present invention;

FIG. 4 is a diagrammatic view illustrating the catheter of the present invention having a distal end portion of an elongated balloon properly inflated in the bladder of a patient;

FIG. 5 is a diagrammatic view illustrating the catheter having a proximal end portion of the balloon inflated outside the urethra to prevent damage to the urethra;

DESCRIPTION OF THE PREFERRED EMBODIMENTS

Figure 6:
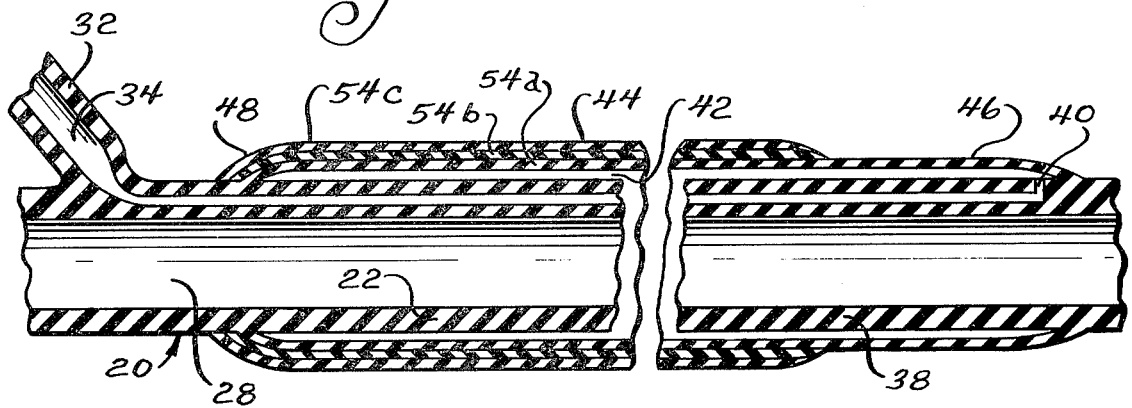
FIG. 6 is a fragmentary sectional view of another embodiment of the present invention.

Referring now to FIGS. 1 and 2, there is shown a catheter generally designated 20 having an elongated shaft 22 for insertion into the urethra of a patient. The shaft 22 has a drainage eye 24 adjacent a distal end 26 of the shaft, and a drainage lumen 28 communicating with the drainage eye 24 and extending to a proximal end 30 of the shaft. The catheter 20 has a side arm 32 and an inflation lumen 34 communicating with valve means 36 adjacent the outer end of the side arm. The inflation lumen 34 extends through the side arm 32 and a wall 38 of the shaft 22, and has a distal end 40 which communicates with a space 42 intermediate an elongated flexible balloon 44 and the shaft 22.

The balloon 44 overlies the catheter shaft 22 and has a length approximating or greater than the average-sized urethra for the particular sex of the patient in which it will be placed. The balloon 44 has a distal end portion 46 for inflation in the patient's bladder in order to retain the catheter in the patient, and a proximal end portion 48 for inflation outside the patient's urethra when the distal end portion 46 is obstructed by the urethra during inflation of the balloon. The balloon 44 may be made from an elastic material, such as latex, and other rubber derivatives, or silicone, and other similar elastomers. For a latex catheter, the balloon 44 may be made by coating the outer surface of the catheter shaft corresponding to the space 42 with bentonite, or water soluble, or other suitable separating compound, during production of the catheter, and dipping the coated shaft in a latex solution. The wall thickness of the balloon 44 may be substantially uniform, as shown. The distal end 40 of the inflation lumen 34 preferably communicates with the space 42 adjacent the distal end portion 46.

In this embodiment of the catheter, the transverse or lateral radius of the distal end portion 46 of the balloon 44 is greater than the lateral radius of the proximal end portion 48. The distal end portion 46 of the balloon 44 is thus outwardly flared relative the remainder of the balloon. According to the law of Laplace, the pressure required to inflate a balloon is proportional directly to its tangential tension and inversely to its transverse and longitudinal radii. Since the transverse radius of the distal end portion 46 of the balloon is greater than the transverse radius of the proximal end portion 48, the distal end portion will inflate at a lower pressure than the pressure required to inflate the proximal end portion.

The balloon 44 may be inflated by connecting a syringe to the valve means 36, and pumping fluid through the valve means and inflation lumen into the balloon space 42. As shown in FIG. 4, the catheter has been inserted through the urethra U such that the distal end portion 46 of the balloon is properly located in the bladder B, the distal end portion will inflate in the bladder since the distal end portion is unobstructed by the urethra and inflates at a lower pressure than that of the proximal end portion. Hence, the proximal end portion 48 remains uninflated, and the inflated distal end portion retains the catheter in the patient for draining the bladder. However, if the distal end of the catheter has not been fully inserted into the bladder B, as shown in FIG. 5, such that the distal end portion 46 is located in the urethra U when the balloon is inflated, the proximal end portion 48 of the balloon inflates due to the obstruction of the distal end portion by the urethra. The pressure required to inflate the proximal end portion, although higher than that required to inflate the distal end portion, is sufficiently low to prevent damage to the urethra when the distal end portion is obstructed by the urethra during inflation by the balloon. The difference in pressure required to inflate the distal and proximal end portions of the balloon may be determined by appropriate choice of the transverse radii of the balloon end portions. Accordingly, the catheter of the present invention prevents damage to the urethra if the balloon is improperly inflated with the distal end portion in the urethra.

Similarly, once the distal end portion 46 of the balloon has been properly inflated in the bladder, as shown in FIG. 4, if the patient attempts to withdraw the catheter from the urethra, the distal end portion 46 of the balloon automatically deflates as it passes into the urethra, as shown in FIG. 5, and the proximal end portion 48 of the balloon substantially immediately inflates to prevent damage to the urethra. Although the pressure difference required to inflate the distal and proximal end portions of the balloon is suitably chosen to prevent urethral damage when the patient attempts to withdraw the catheter, it is noted that the act of the patient itself in pulling the catheter facilitates the transfer of the inflation fluid from the distal end portion to the proximal end portion of the balloon. This follows since the patient stretches the proximal end portion of the balloon, thus decreasing the amount of pressure which is normally required to inflate the proximal end portion of the balloon and increasing the ease with which it inflates relative the distal end portion. If the patient releases the catheter prior to pulling the distal end portion 46 of the balloon into the urethra, the distal end portion 46 of the balloon will reinflate in the bladder to further retain the catheter in its proper position for liquid drainage.

Figure 7:
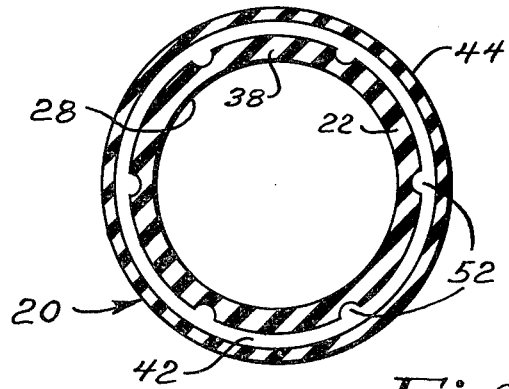
FIG. 7 is a sectional view taken substantially as indicated along the line 7—7 of FIG. 3.

Another embodiment of the catheter is illustrated in FIG. 3 and 7, in which like reference numerals designate like parts. In this embodiment, the wall thickness of the proximal end portion 48 of the balloon 44 is greater than the thickness of the distal end portion 46 of the balloon, such that the pressure required to inflate the proximal end portion 48 is greater than that required to inflate the distal end portion 46. The difference in pressures required to inflate the proximal and distal end portions 48 and 46 may be controlled by selecting the appropriate thickness of the respective end portions. The distal end 40 of the inflation lumen 34 may communicate with the space 42 adjacent the proximal end portion 48 of the balloon, as shown. Due to the relative thickness of the distal and proximal end portions of the balloon, the distal end portion 46 of the balloon will inflate in the bladder B, as shown in FIG. 4, when the catheter has been properly placed in a patient and the balloon is inflated. However, as previously described in connection with FIG. 5, the proximal end portion 48 of the balloon will inflate when the distal end portion 46 of the balloon is obstructed by the urethra U resulting from improper placement of the catheter prior to inflating the balloon, or from an attempt by the patient to withdraw the inflated catheter balloon through the urethra. Thus, the catheter of FIGS. 3 and 7 also prevents damage to the patient's urethra in a manner similar to that described in connection with the catheter of FIGS. 1 and 2.

During normal use of the catheter, as shown in FIG. 4, the elasticity of the proximal end portion 48 of the balloon is sufficient to maintain the distal end portion 46 inflated in the bladder, as with the catheter of FIGS. 1 and 2, even in the presence of spasms which might occur in the bladder. Similarly, the balloon has sufficient elasticity to retract itself to a position adjacent the outer surface of the shaft 22 responsive to deflation of the balloon through the inflation lumen preparatory to removing the catheter from the patient.

As shown in FIGS. 3 and 7, the catheter shaft 22 has a plurality of longitudinally extending grooves 52 in its outer surface which communicate between the proximal and distal end portions 48 and 46 of the balloon. The grooves 52 facilitate fluid communication between the proximal and distal end portions of the balloon, particularly during deflation of the balloon 44 when the balloon 44 may be drawn against the outer surface of the shaft, and otherwise might obstruct fluid passage from the distal end portion 46 of the balloon to the distal end 40 of the inflation lumen 34.

Another embodiment of the catheter of the present invention is illustrated in FIG. 6, in which like reference numerals designate like parts. In this embodiment, the wall thickness of the proximal end portion 48 of the balloon 44 is also greater than the wall thickness of the distal end portion 46 of the balloon. However, in this embodiment the increased wall thickness of the proximal end portion is obtained by providing a plurality of layers 54a, 54b, and 54c in this portion of the balloon. In a preferred embodiment, the increased wall thickness of the multi-layer proximal end portion extends to adjacent the distal end portion 46 of the balloon which is inflated in the bladder when the catheter has been properly placed in the patient. Additionally, the durometer hardness of the various layers 54a, b, and c of the proximal end portion may be separately selected to obtain the desired inflation pressure differential between the proximal and distal end portions of the balloon. However, even if the durometer hardness of the various layers 54a, b, and c is the same, it is apparent the additional layers permit a fairly precise control over the difference in pressures required to inflate the proximal and distal end portions of the balloon. For a latex catheter, the additional layers 54b and c of the proximal end portion may be obtained by dipping the proximal end portion of the balloon in a latex solution two additional times. The operation of the catheter of FIG. 6 in preventing damage to the patient is similar to that previously described in connection with the catheter of FIGS. 3 and 7.

Thus, there has been described a catheter in which a retention balloon may be inflated without damage to the patient even if a retention portion of the balloon has been improperly located in the patient's urethra during inflation. Moreover, once the retention portion of the balloon has been properly inflated in the bladder, the catheter prevents damage to the patient if the patient should attempt to withdraw the catheter and the retention portion of the balloon through the urethra. Moreover, if the inflation lumen 34 is obstructed when it is desired to deflate the distal end portion of the balloon after catheterization has been completed, the catheter, including the proximal end portion of the balloon, may be severed proximal the urethra. Fluid is then permitted to pass from the distal end portion of the balloon through the space 42 and the severed portion of the balloon to deflate the distal end portion. Blockage in the inflation lumen may be caused by accumulation of material, such as bentonite, in the lumen.

According to a method of the present invention, a catheter having an elastic balloon with a length approximating or greater than the length of the urethra is inserted into the urethra. A distal end portion of the balloon is inflated in the bladder without significantly inflating a proximal end portion of the balloon when the distal end portion is located in the bladder. A proximal end portion of the balloon is inflated outside the urethra when the distal end portion of the balloon is located in the urethra to prevent damage to the urethra. According to a method of the invention a catheter having an elastic balloon with a length approximating or greater than the length of the urethra is inserted into the urethra. A distal end portion of the balloon is inflated in the bladder to retain the catheter in the patient. The distal end portion of the balloon is deflated and a proximal end portion of the balloon is substantially immediately inflated outside the urethra responsive to withdrawal of the distal end portion into the urethra.

The foregoing detailed description is given for clearness of understanding only, and no unnecessary limitations should be understood therefrom, as modifications will be obvious to those skilled in the art.

We claim:

1. A catheter for insertion through a body canal to a body cavity and retention therein, comprising:
    an elongated shaft having a proximal end, a distal end, and an inflation lumen; and
    an elongated flexible balloon overlying the shaft and having a length approximating or greater than the length of the body canal, said balloon and shaft defining a space communicating with the inflation lumen for inflation of the balloon, said balloon having a distal end portion for placement and inflation to enlarged proportions in the body cavity relative a longitudinal portion of the balloon in the body canal, and a proximal end portion being sufficiently elastic to maintain the distal end portion inflated in its enlarged proportions when the distal end portion is located in the body cavity, and being sufficiently elastic and free to inflate outside the body canal to enlarged proportions relative the portion of the balloon in the body canal when the distal end portion is obstructed by the body canal.

2. The catheter of claim 1 wherein said balloon is made from a latex material.

3. The catheter of claim 1 wherein said balloon is made from a silicone material.

4. The catheter of claim 1 wherein said proximal end portion of the balloon is located outside the body canal when the distal end portion of the balloon is located in the body cavity.

5. The catheter of claim 1 wherein said proximal end portion of the balloon is located outside the body canal when the distal end portion of the balloon is located in the body cavity and the proximal end of the catheter shaft is stretched.

6. The catheter of claim 1 wherein the pressure required to inflate the proximal end portion of the balloon is greater than the pressure required to inflate the distal end portion of the balloon.

7. The catheter of claim 6 wherein the pressure required to inflate the proximal end portion of the balloon is less than the pressure required to inflate the distal end portion of the balloon when the proximal end portion of the balloon is stretched.

8. The catheter of claim 6 wherein the difference in pressures required to inflate the proximal and distal end portions of the balloon is sufficiently low to prevent damage to the body canal when the distal end portion of the inflated balloon is obstructed by the body canal.

9. The catheter of claim 1 wherein the lateral radius of the distal end portion of the balloon is greater than the lateral radius of the proximal end portion of the balloon.

10. The catheter of claim 1 wherein the wall thickness of the balloon is substantially uniform.

11. The catheter of claim 1 wherein the wall thickness of the proximal end portion of the balloon is greater than the wall thickness of the distal end portion of the balloon.

12. The catheter of claim 11 wherein the proximal end portion of the balloon extends to adjacent the distal end portion of the balloon.

13. The catheter of claim 11 wherein the proximal end portion of the balloon comprises a plurality of layers of a flexible material.

14. The catheter of claim 1 wherein the elasticity of the distal end portion of the balloon is greater than the elasticity of the proximal end portion of the balloon.

15. The catheter of claim 1 wherein a distal end of the inflation lumen communicates with the space intermediate the balloon and shaft adjacent the distal end portion of the balloon.

16. The catheter of claim 1 wherein a distal end of the inflation lumen communicates with the space intermediate the balloon and shaft adjacent the proximal end portion of the balloon.

17. The catheter of claim 1 wherein the catheter shaft includes a plurality of longitudinally extending grooves in its outer surface, said grooves communicating between the proximal and distal end portions of the balloon.

18. The catheter of claim 1 wherein said balloon is sufficiently elastic to retract adjacent the outer surface of the shaft responsive to deflation of the balloon through the inflation lumen.

19. The catheter of claim 1 wherein said shaft includes a drainage eye adjacent the distal end of the shaft, and a drainage lumen communicating with the drainage eye and extending toward the proximal end of the shaft.

20. A catheter for insertion through a body canal to a body cavity and retention therein, comprising:
an elongated shaft having a proximal end, a distal end, a drainage eye adjacent the distal end of the shaft, a drainage lumen communicating with the drainage eye and extending toward the proximal end of the shaft, and an inflation lumen; and
an elongated flexible, elastic balloon overlying the shaft and having a length approximating or greater than the length of the body canal, said balloon and shaft defining a space communicating with the inflation lumen for inflation of the balloon, said balloon having a distal end portion for placement and inflation in the body cavity, and an inflatable proximal end portion being sufficiently elastic to maintain the distal end portion inflated when the distal end portion is located in the body cavity, said distal end portion having a greater lateral radius than the lateral radius of the proximal end portion prior to inflation of the balloon, whereby the pressure required to inflate the proximal end portion of the balloon is greater than the pressure required to inflate the distal end portion of the balloon 21. The catheter of claim 20 wherein a distal end portion of the inflation lumen communicates with said space adjacent the distal end portion of the balloon.

22. A catheter for insertion through a body canal to a body cavity and retention therein, comprising:
an elongated shaft having a proximal end, a distal end, a drainage eye adjacent the distal end of the shaft, a drainage lumen communicating with the drainage eye and extending toward the proximal end of the shaft, and an inflation lumen; and
an elongated flexible, elastic balloon overlying the shaft and having a length approximating or greater than the length of the body canal, said balloon and shaft defining a space communicating with the inflation lumen for inflation of the balloon, said balloon having a distal end portion for placement and inflation in the body cavity, and a proximal end portion inflatable outside the body canal, the wall thickness of the proximal end portion being greater than the wall thickness of the distal end portion, said proximal end portion of the inflated balloon maintaining the distal end portion inflated when the distal end portion is located in the body cavity, and inflating to enlarged proportions when the distal end portion of the balloon is obstructed by the body canal.

23. The catheter of claim 22 wherein the durometer hardness of the proximal end portion is greater than the durometer hardness of the distal end portion.

24. The catheter of claim 22 wherein the proximal end portion of the balloon comprises a plurality of layers of an elastic material.

25. The catheter of claim 22 wherein a distal end of the inflation lumen communicates with said space adjacent the proximal end of said balloon.

26. The catheter of claim 25 wherein said shaft includes a plurality of grooves in its outer surface communicating between the proximal and distal end portions of the balloon.

27. A catheter for insertion through a body canal to a body cavity and retention therein, comprising:
an elongated shaft having a proximal end, a distal end, a drainage eye adjacent the distal end of the shaft, a drainage lumen communicating with the drainage eye and extending toward the proximal end of the shaft, and an inflation lumen; and
an elongated flexible, elastic balloon overlying the shaft and having a length approximating or greater than the length of the body canal, said balloon and shaft defining a space communicating with the inflation lumen for inflation of the balloon, said balloon having a distal end portion for placement and inflation in the body cavity, and a proximal end portion inflatable at a greater pressure than the distal end portion when unstretched and at a lesser pressure than the distal end portion when stretched.

28. A method of catheterizing a patient, comprising the steps of:
inserting a catheter having a common elastic balloon with a length approximating or greater than the length of the urethra into the urethra;
inflating a distal end portion of the balloon in the bladder without significantly inflating a proximal end portion of the balloon when the distal end portion is located in the bladder;
inflating the proximal end portion of the balloon outside the urethra when the distal end portion of the balloon is located in the urethra to prevent damage to the urethra; and
obstructing a central portion of said balloon in the urethra during both of said inflating steps.

29. A method of catheterizing a patient, comprising the steps of:
inserting a catheter having an elastic balloon with a length approximating or greater than the length of the urethra into the urethra;
inflating a distal end portion of the balloon in the bladder to retain the catheter in the patient; and
deflating the distal end portion and substantially simultaneously inflating a proximal end portion of the balloon outside the urethra responsive to withdrawal of the distal end portion into the urethra.

* * * * *